April 29, 1958     J. P. AU WERTER     2,832,367
APPARATUS FOR CONTROLLING FLUID FLOW OVER PARALLEL PATHS
Filed Dec. 30, 1953     3 Sheets-Sheet 1
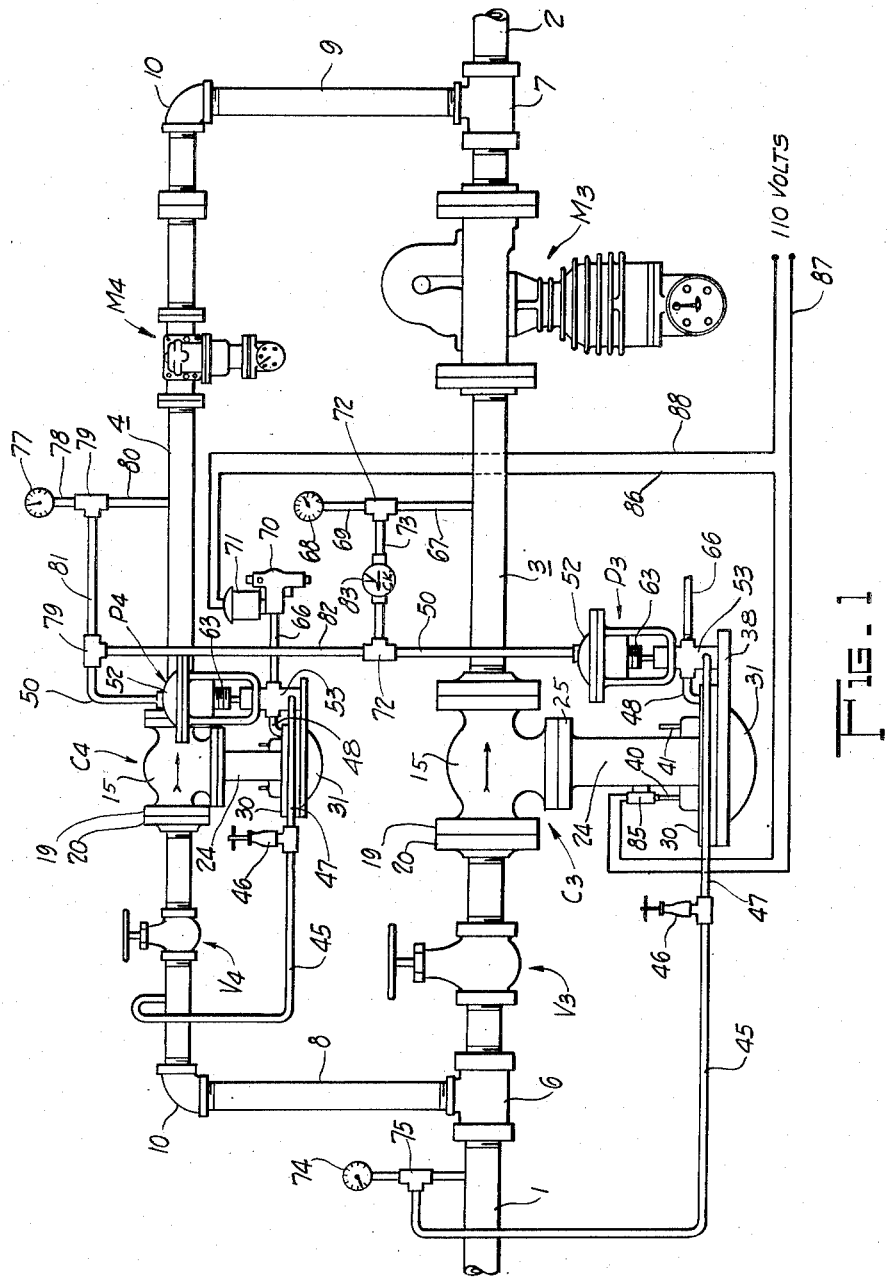
INVENTOR.
JAY P. AU WERTER
BY George Knowles
ATTORNEY April 29, 1958  J. P. AU WERTER  2,832,367
APPARATUS FOR CONTROLLING FLUID FLOW OVER PARALLEL PATHS
Filed Dec. 30, 1953  3 Sheets-Sheet 2
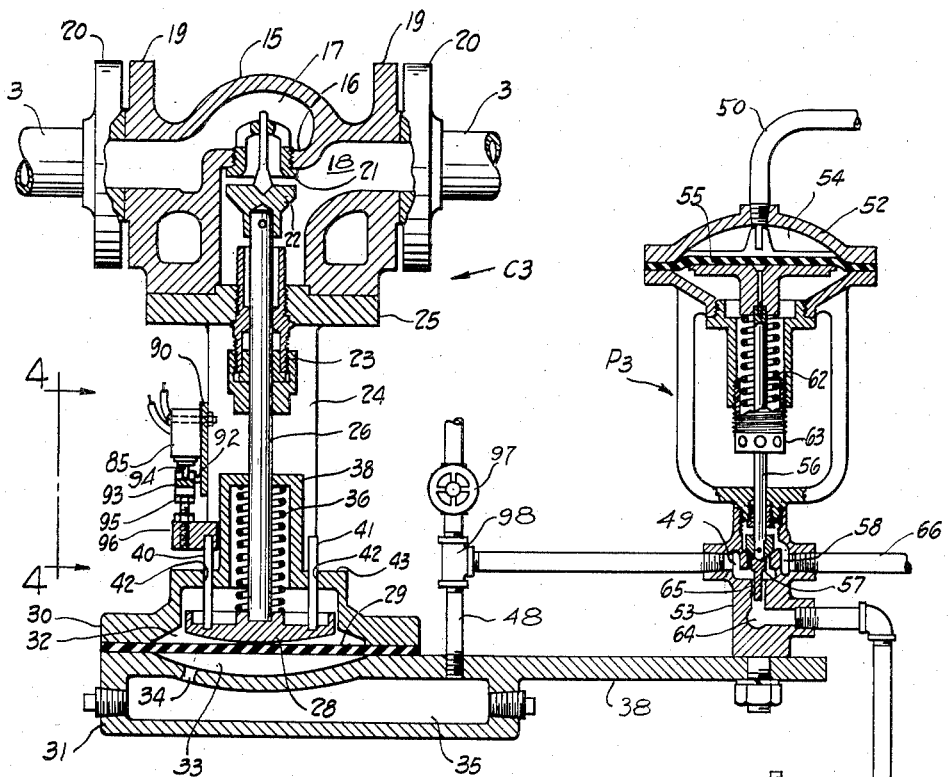
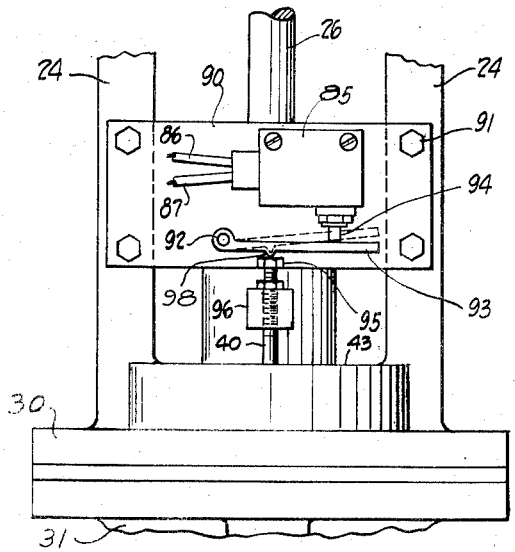
INVENTOR.
JAY P. AU WERTER
BY George Knowles
ATTORNEY April 29, 1958  J. P. AU WERTER  2,832,367
APPARATUS FOR CONTROLLING FLUID FLOW OVER PARALLEL PATHS
Filed Dec. 30, 1953  3 Sheets-Sheet 3
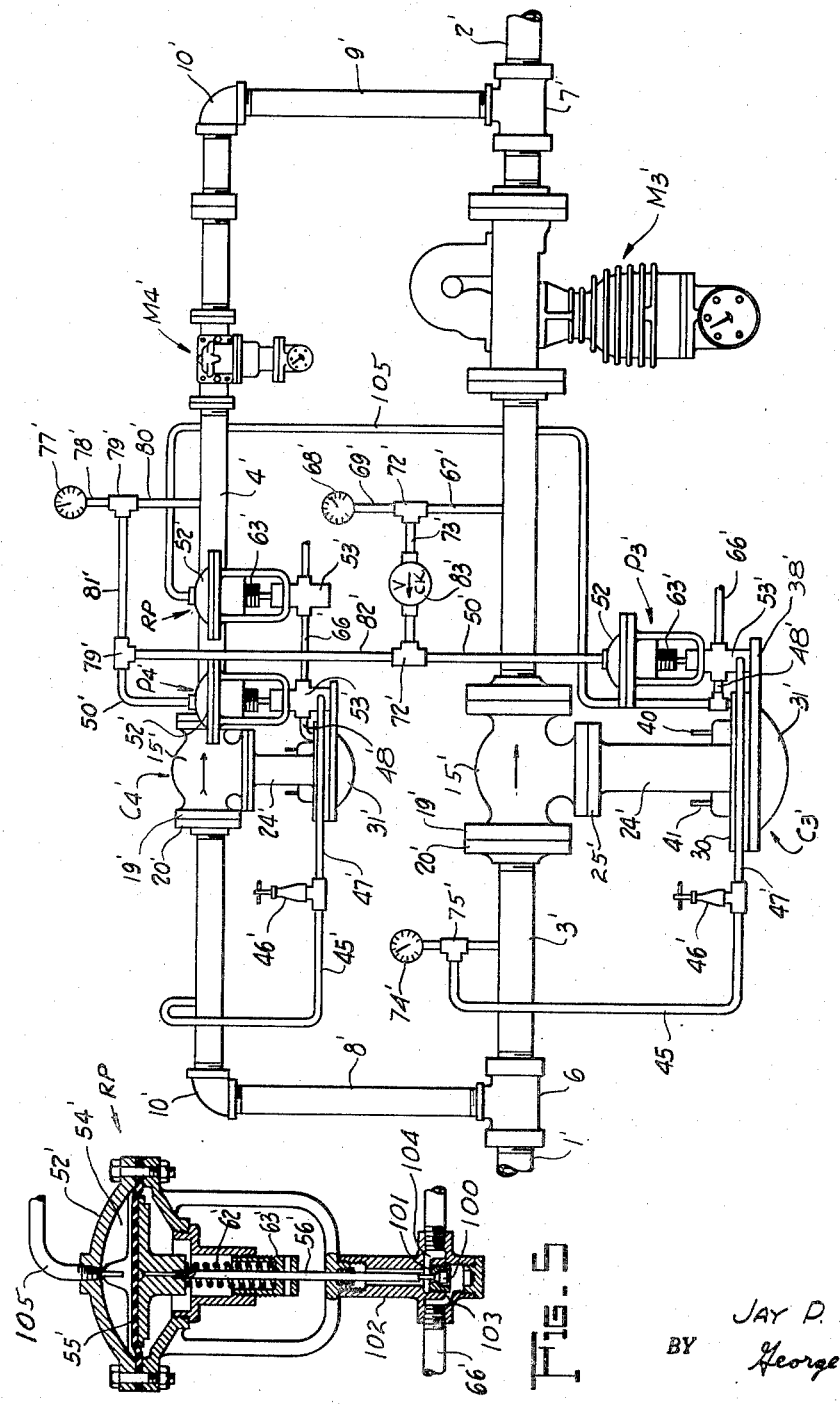
INVENTOR.
JAY P. AU WERTER
BY George Knowles
ATTORNEY

United States Patent Office 2,832,367
Patented Apr. 29, 1958

2,832,367

APPARATUS FOR CONTROLLING FLUID FLOW OVER PARALLEL PATHS

Jay P. Au Werter, Cleveland, Ohio

Application December 30, 1953, Serial No. 401,298

21 Claims. (Cl. 137—112)

This invention relates to the flow of fluids in a demand system, particularly to the control of fluid flowing in a system at a widely variable rate, and especially to control and measurement in such a system wherein such flow is confined to one or more of several parallel paths, depending upon the flow rate.

In the measurement of the flow of fluid media through pipes and similar conduits difficulty has been experienced in situtations where the rate of flow varies over a wide range particularly where the flow may vary over a relatively high range for a considerable period of time, may then vary over a relatively low range, and may then return to the high range—and so on. The measurement of steam supplied to a heating system, for example, presents such a problem because of the irregular character of the demand. During the day a relatively high rate of steam flow into the heating system is required to maintain a desired temperature level. The demand will, however, vary during the day as doors are opened or the climate conditions change. During the night the demand for steam is relatively low as a result of the setting back of thermostats or other controls. Yet even during the night a variation at the low level may result from climatic or other changes.

Information as to the quantitative flow of fluid steam from a supply main into a heating system is of importance both to a utility company or other concern supplying the steam and to the user. Although devices are available for insertion in steam lines and the like for measuring fluid flow, not only as to rate, but as to quantity, such devices do not give the desired accuracy of results. Because flow measuring devices, particularly those for making quantitative measurements of flow, characteristically give accurate results over but a relatively low range or spread of flow rates, a flow meter capable of measuring quantitative flow of steam through a conduit or pipe at a relatively high rate will not make accurate measurement of such flow at a relatively low rate. Thus in the heating system mentioned, a flow meter inserted in the steam supply line or main and capable of passing and measuring steam as required during the peak load period in the day time would be incapable of measuring accurately the quantitative steam flow during the low period at night. In fact, one of the objections to the use of fluid flow meters in the measurement of steam sold commercially is that the meter which will handle peak loads characteristically functions poorly at low flow rates and might even pass steam at a rate sufficient for the needs of the system when the demand is low without any response thereto or measurement thereof whatever. Obviously, a low capacity meter capable of accurate measurement of fluid flow at only the relatively low rates will be incapable of accommodating or measuring the flow during the high flow rate periods.

It is therefore one of the principal objectives of the present invention to provide an apparatus for controlling automatically the flow of fluid in a system in such a way that accurate measurement can be made of, say, the flow rate or quantity flow over any desired wide range of flow rates, using flow meters presently available. More particularly, it is sought to provide such an apparatus wherein the fluid flow from one point to another of a system and between which points it is desired to measure such fluid flow, is directed over two or more parallel paths, one for fluid flow at a relatively low rate, and another, or others, for fluid flow at a relatively high rate. With the fluid restricted to one path when flowing at a rate falling in one predetermined range or below one predetermined maximum and restricted to another path or paths when flowing at a rate or rates falling in another predetermined range or ranges, or above another predetermined minimum, it is apparent that by appropriate selection of suitable flow meters, each accurate over a predetermined range of flow rates, and the use of such meters each in that path of the system carrying fluid only at the corresponding rates of flow, an accurate measurement can be made of the flow between the two points of the fluid system regardless of the flow rate or rates.

As another objective, it is sought to provide a fluid flow control system of the character described wherein the flow of fluid is, at any given time, substantially restricted to a single one of the parallel paths.

The realization of the objectives mentioned and the establishment of a control system like that referred to are accomplished by a unique hook-up or interconnection of components individually or separately well known. In the present invention the fluid flow through each of several pipe lines is governed by a main control valve of the pressure reducing type which valve is preferably adapted to increase the flow rate automatically upon an increase in demand as evidenced by a pressure reduction on the use side of the valve, and to decrease the flow rate automatically upon a decrease in demand as evidenced by a pressure increase on such use side of the valve. Typically, such a reducing valve may comprise a fluid actuated diaphragm which acts on a spring biased valve sealing element or disc to variably shift the latter toward and away from the companion valve seat in altering the fluid flow rate through the valve from the relatively high pressure supply side to the relatively low pressure use side. The control or reducing valves in the several lines are of standard or conventional construction and may be either the direct acting type wherein the diaphragm is subjected to the fluid pressure on the use side of the valve so that as the back pressure increases the valve closes and vice versa, or preferably, and as illustrated, the indirect type. That is to say, in the indirect type, instead of subjecting the actuating diaphragm of the valve directly to the fluid pressure prevailing in the system on the use side, there is interposed a pilot valve system which governs the main reducing or control valve in response to the use demand as evidenced by pressure fluctuations on the use side. The accomplishment of the objectives of the present invention is obtained through an interconnecting or interlocking arrangement which is established between the seevral control valves.

In the illustrated arrangement utilizing indirectly governed control or reducing valves the pilot valve system of one of the valves (and through such pilot valve the control valve governed thereby) is made responsive to another of the control or reducing valves or to the pilot valve or pilot valve system of the latter. Such response is obtained as by an overriding of the slave or responsive pilot valve system using, say, a valve which suitably monitors the flow of fluid in the pilot valve as by preventing the discharge of fluid to the atmosphere in the customary pilot valve venting action. The overriding valve associated with the one or servient control valve may be actuated electrically, hydraulically, pneumatically or in any other suitable manner which provides automatic actuation for the desired overriding action whenever the other or dominant control or reducing valve is open. In one arrangement the overriding valve functions, say, in response to the physical movement of the sealing element of the dominant control valve as by means of an electrical system in which a switch at the dominant control valve energizes a solenoid that operates the overriding valve. In another arrangement the overriding valve functions, say, in response to the relatively low pressure which is present in the diaphragm chamber of the dominant control valve. To this latter end, and as one of the more specialized objectives of the invention, there is provided the combination of a pilot valve and a companion reverse pilot valve at and governing the servient control valve, the reverse pilot valve being responsive to the low fluid pressure in the diaphragm chamber of the dominant control valve when the latter is open to override the companion pilot and compel positive closing of the servient control valve.

Other objects and advantages of the invention pertain to certain novel features of construction and combinations and arrangements of parts, all of which are apparent in the following detailed description of the invention, or in the accompanying drawings in connection with which the description is made, which drawings form a part of the specification.

In the drawings:

Figure 1 is a schematic diagram of a fluid system for controlling and measuring the flow of steam or the like between one point and another of a supply main or conductor;

Fig. 2 is an axial section through one of the pressure reducing flow control valves used in the system and through the pilot valve associated therewith;

Fig. 3 is an elevational detail showing the electrical switch used in the interlock between the flow control valves of the two parallel fluid lines of the system, this view being taken substantially along the line indicated at 3—3 of Figure 2 and enlarged with respect to that figure;

Fig. 4 is a schematic diagram similar to Figure 1 of a fluid system embodying a modification of the inventive concept wherein a control valve in one pipe line is interconnected with and governed by a valve in another pipe line through a fluid medium; and Fig. 5 is a vertical sectional view through the reverse pilot valve employed as the overriding control in the system of Fig. 4.

In the utilization of the present system for controlling and measuring the flow of a fluid such as steam supplied, say, to heating a building, the main steam supply line is interrupted and the desired components inserted therein. Referring to Figure 1, wherein is illustrated such an arrangement, the main steam supply line or conduit carrying high pressure steam from a suitable source is indicated at 1. At 2 is indicated the continuation of the main steam line leading from the present control system components to the heating system or other steam consuming instrumentality. Between and connecting the incoming steam conduit 1 and the outgoing steam conduit 2 are steam lines indicated generally at 3 and 4, which constitute parallel fluid paths to be traversed alternatively by the steam fed into the system for use. To reach the using instrumentality or system from the supply line or main 1 and by way of the pipe or conduit 2, the steam or fluid must traverse a path provided by one of the conduits 3 or 4.

In the arrangement shown, by way of example, the control system is illustrated and will be described as an installation for measuring steam supplied to heat a building having a variable steam consumption load varying from zero to about 750 pounds per hour. The present control system is planned, as one of its features, so that steam demand over a relatively low range of flow rates is supplied wholly through the smaller branch or conduit 4, which in the example mentioned may comprise 1" pipe and fittings. Steam demand over a relatively high range of flow rates is supplied wholly through the larger branch or conduit 3 which may comprise, in the example mentioned, 2" pipe and fittings.

The particular division point or flow rate at which the flow is to be shifted from one of the parallel pipes or paths to the other may be varied, of course, and more than the two parallel paths shown may be employed. To make the actual measurements of the fluid flow through the several parallel paths each is provided with a conventional flow meter suitably inserted. The larger, or 2" conduit, has a meter M3, whereas the smaller conduit 4 has a meter M4. These meters may be such as known commercially as Shuntflo meters as manufactured by Builders-Providence, Inc. Division of Builders Iron Foundry, Providence, Rhode Island. They incorporate direct reading totalizers, as shown, or may have electric contact mechanisms attached to operate remote counters, recorders, demand meters and the like.

The larger meter M3, and the larger of the parallel lines in which it is inserted are selected with sufficient capacity to handle the maximum flow rate that the system will be called upon to deliver. In the example mentioned, a totalizing meter such as a model SMKS Shuntflo meter having a maximum capacity of about 1000 pounds of steam per hour at about 50 pounds gauge pressure is used. The smaller meter M4, and the conductor line in which it is inserted and that carries the fluid flow at low rates, are of relatively low capacity. Thus is insured acceptable accuracy of the meter system at extremely low flow rates near the shut-off point. In the example mentioned, the smaller meter M4 is a totalizer such as a 150 pound per hour maximum capacity model SMDH Shuntflo meter.

The flow of the fluid medium, steam in the example assumed, is separately governed in each of the parallel courses or lines 3 and 4 by a pilot operated pressure reducing valve, which is individually inserted in and associated with the particular line to be controlled thereby, but, as will appear, is tied to, or interlocked with, the corresponding valve of the other parallel line or lines. Here the reducing flow control valve in the line 3 is indicated at C3, and the pilot valve therefor at P3. The reducing flow control valve for the line 4 is indicated at C4 and its associated pilot valve at P4.

Shut-off valves V3 and V4 are provided in the lines 3 and 4 respectively, so that one or the other of the parallel paths may be closed for servicing or repairing as desired. These shut-off valves V3 and V4 are conventional and may be of any desired type, it being remembered that they normally are open so as not to interfere with fluid flow in any of the parallel lines. The pipe line 3, since it is to carry the peak demand loads of the system, is desirably arranged as shown in coaxial alignment with the supply line 1 and the outfeed line 2. In such case the parallel pipe line may be conveniently connected in the desired parallel arrangement as by means of a T indicated at 6 inserted between the line 3 and the main line 1 and between the line 3 and the outfeed line 2. In such case the line 4, which generally parallels the pipe line 3 physically as well as in the fluid flow sense, may include lateral extensions 8 and 9 which are connected to the T's 6 and 7. The line 4 is joined to the lateral extensions 8 and 9 as by elbows 10.

The reducing or flow control valve C-3 governing the flow of steam or other fluid through the line 3 and the corresponding valve C-4 in line 4 are of similar construction although, as indicated in Fig. 1, they may be of different physical sizes. For purposes of illustration and explanation the internal constructions of the larger reducing valve C-3 and its pilot valve are illustrated in Fig. 2, it being understood that the valve C-4 and its associated pilot valve and other parts are substantially the same. For clarity of illustration certain parts of the control and other valves are shown rotated about the axis of the particular valve so as to appear in the plane of the drawing. Each main control valve comprises a main body or casing 15, the interior of which is divided by a partition 16 into a fluid receiving chamber 17 and a fluid discharge chamber 18. The inlet and outlet openings communicating with the valve chambers 17 and 18 are formed in circular end flanges 19 by means of which the valve body is attached as by bolts to similar flanges of fittings 20 on the ends of pipe sections comprising the respective lines. The partition 16 separating the valve chambers is apertured to receive a main circular valve seat 21, the latter being engaged by valve disc 22 which thus seals the opening in the partition.

The valve disc 22 is carried on a main valve stem 26 which extends through a fluid seal or packing gland 23 in head portion 25 of main yoke member 24. The yoke head 25 seals an opening into the discharge chamber 18 of the casing body 15 through which the main valve stem 26 is projected into such chamber. Desirably the valve disc 22 is formed with a stem slidably engaged in a guide bore formed centrally in a spider element of the valve seat 21.

At the end of the main valve stem 26 opposite the valve disc 22 is attached a main diaphragm plug or pressure distributing head 28 which is engaged by flexible main diaphragm 29. This diaphragm is peripherally clamped between end 30 on the yoke 24 and a hollow head 31 secured to the yoke end 30 as by cap screws or bolts (not shown). The diaphragm chamber cooperatively defined by confronting recessed surfaces in the yoke end 30 and the hollow head 31 is divided by the diaphragm into portions 32 and 33, the former being continuous with a coaxial cylindrical portion that accommodates the plug 28 as the latter is moved by the action of the diaphragm 29. The other portion 33 of the diaphragm chamber is in communication as through an opening 34 with a so-called water bottle chamber 35 in the head 31 so as to subject the diaphragm to the pressure of fluid introduced into the head chamber 35.

The main valve stem 26 is biased normally to move the closure disc 22 away from the valve seat 21 and thereby to open the main valve as by means of a helical coil compression spring 36 which surrounds the valve stem and reacts against the plug 28 and the end wall of an axial cylinder extension 38 of the yoke end 30, such extension constituting an enclosure for the spring and being formed with an end opening through which the valve stem 26 has a free sliding fit.

The plug 28 has secured therein a pair of combination indicators and guide pins 40 and 41 which are disposed in parallel relation to one another and to the main stem 26 on diametrically opposite sides of the latter. These pins project through guide openings 42 in circular end wall portion 43 of the yoke end 30 and the extent of such projection serves as a visible indication of the position of the main valve stem 26 and of the valve closure disc 22 in relation to the valve seat 21.

Since the high pressure steam or other fluid enters the valve chamber 17 from the left as viewed in Fig. 2 and flows downwardly through the passage in the member having the valve seat 21, it is apparent that the closure disc 22 must act against the pressure of the fluid in closing the valve and in maintaining the seal.

Pressure reducing valves of this type are characterized in that they position the valve disc 22 in relation to the main valve seat 21 so that exactly the right amount of steam or fluid is passed through the opening to satisfy the demand on the reduced or low pressure side comprising chamber 18 and the heating system or instrumentality being supplied. The force supplied by the helical coil spring 36 normally acts to move the valve disc 22 to full open position. The closing of the valve is effected by pressure of the diaphragm 29 against the plug or head 28, which acts through the stem 26 to move the valve disc into sealing relation with the seat 21 in closing the valve against the high fluid pressure in the entrance chamber 17. Fluid under pressure is supplied to the diaphragm chamber 33 from the high pressure supply main 1 through a relatively small diameter conduit 45, an adjustable pressure throttling metering or graduating valve 46, a conduit 47, the pilot valve P–3 (or P–4 in the case of the pressure reducing valve C–4) and a conduit 48 which connects outlet chamber 49 of the pilot valve to the water bottle chamber 35 of the main valve head 31.

The metering or graduating valve 46 comprises a body 44 into which are screwed the threaded ends of the steam tubes 45 and 47. The hollow interior of the body is divided into receiving and discharge chambers by an integral metal partition apertured to receive a seat member 51 formed with an elongated passage of tapering cross section into which is projected a needle 59 on the end of a threaded adjusting rod 60. This rod screwed through the bonnet or cap of the valve is movable axially by screwing into or out of the bonnet in effecting shifting of the tapered needle 59 in the correspondingly tapered passage through the seat member 51. By altering the position of the needle in the seat member the opening through the metering valve can be adjusted to pass fluid or steam at any desired rate. If the steam passed into the pilot valve by the metering valve 46 is not allowed to escape, the main control valve closes as a result of the increased pressure in the diaphragm chamber 33. It is apparent that the steam passage in the metering valve 46 is opened or increased in size to increase the sensitivity or closing rate of the main control valve and is decreased in size to reduce the sensitivity or closing rate of such main valve.

In regulating the supply of throttled fluid to the diaphragm 33 the pilot valve P–3 (or P–4 in the case of the valve C–4) responds to the pressure on the low pressure side of the pressure reducing valve C–3 (or C–4). A relatively small diameter conduit line 50 is connected through other conduits, as will appear, into an aperture in one of the sections of the pipe line 3 (or 4) and is continuous to cap 52 of the pilot valve into which it is screwed. This cap and the upper end of pilot valve casing 53 define a diaphragm chamber 54 containing a diaphragm assembly 55 that acts on a stem 56 to close a valve member or resistance plug 57 against an annular seat in a partition which divides a chamber in the lower part of the pilot valve casing 53 into the outlet chamber portion 49 previously mentioned and an exhaust or vent chamber portion 58. A helical coil compression spring 62 acts between an adjusting plug 63 and the diaphragm assembly 55 normally to raise the resistance plug valve member 57 away from the valve seat to vent the chamber 49 through the exhaust chamber 58.

High pressure fluid, steam in the present case, throttled through the adjustable metering valve 46 is admitted to the chamber portion 49 in the pilot valve casing through an inlet 64 in the valve casing 53 into which is screwed the conduit 47 that connects the metering valve to the pilot valve. The inlet communicates with the chamber 49 through an annular clearance in a bore 65 surrounding a pilot stem on the resistance plug 57 that projects through the chamber 49 and into such bore.

When fluid pressure in the pilot valve chamber 54 is relaxed by the falling of the pressure in the conduit 3 on the low pressure side of the main reducing valve C–3 (or C–4) the spring 62 moves the governing resistance plug or valve member 57 away from its seat so that fluid pressure in the pilot valve chamber 49 is permitted to escape from the control system through the chamber 58 and a release conduit 66 screwed into the pilot valve casing 53. In the case of the pilot valve P–3 the release conduit 66 may vent to the atmosphere, as shown, whereas in the case of the pilot valve P–4 the release conduit 66 is terminated by a shutoff valve 70 electrically actuated as by means of a solenoid 71, as will later appear.

When fluid is thus vented from the pilot valve chamber 49 the pressure of fluid in the water bottle chamber 35 and in the diaphragm chamber 33 of the main reducing valve also falls since the metering valve 46 is so adjusted that it does not supply fluid to the pilot valve at a rate sufficient to replace that lost when the resistance plug valve 57 is unseated. The main control disc 22 is then shifted away from the main valve seat 21 by the spring 36. This opening of the main reducing valve, by increasing the rate of flow of steam or other fluid through such valve, satisfies the demand signaled by the pressure reduction on the using side which triggered the action by allowing the pilot valve spring 62 to raise the resistance plug or valve member 57 from its companion seat.

It is apparent that the position of resistance plug valve member 57 in relation to its seat determines whether the high pressure fluid or steam metered through the valve 46 goes to augment the pressure on the diaphragm 29 of the main pressure reducing valve, in which situation the metered fluid builds up the pressure and tends to close or does in fact completely close the main valve disc 22 against its seat 21, or is released from the pilot valve through the discharge chamber 58, in which situation the main valve holds steady unless the pilot valve opens sufficiently to lower the pressure on the main valve diaphragm, in which latter situation the diminution of fluid pressure on the main valve diaphragm 29 results in movement of the main valve disc 22 away from its seat 21 producing the opening of the main control or pressure reducing valve. Thus the position of the resistance plug valve member 57 governs the position of the main valve disc 22 and the degree of opening of the main pressure reducing valve. The upper diaphragm chamber 32 in the main pressure reducing valve C-3 (or C-4 as the case may be) is suitably vented as by clearances about the pins 40 and 41 so that the diaphragm is free to deflect under the influence of the pressure prevailing in the chamber 33.

The setting of the springs 62 in the pilot valves P-3 and P-4 determines the pressures maintained in the heating system or other using instrumentality by the corresponding pressure reducing valves C-3 and C-4 when one or the other of the latter is "in control" or is "master"; that is to say, the setting of the spring in the pilot valve P-3 determines the pressure maintained in the system to the right of the pressure reducing valve C-3 by such valve as viewed in Fig. 1, whereas the setting of the spring in the pilot valve P-4 governs the pressure maintained in the system to the right of the reducing valve C-4 by the latter and as viewed in the same figure. The adjustment of each pilot valve is effected by screwing the adjusting nut 63 accessible through suitable side openings in the body casing 53. Turning the threaded adjusting plug to increase the compressive force in the spring 62 increases the back or control pressure on the use side of the particular pressure reducing valve, whereas backing off the threaded adjusting plug to decrease the spring compression has the effect of reducing back pressure on the use or right side of the reducing valve, as viewed in Fig. 1.

In continuous operation under normal conditions, however, pilot operated reducing valves of the type described operate in neither the full open nor the full closed position but in an intermediate position which permits the steam or other fluid to flow from the supply past the seat 21 at a rate corresponding to the use demand. When the fluid pressure on the use side reduces, signaling an increased demand, the governing spring in the pilot valve pushes the resistance plug away from its seat (or farther away if already unseated), thus allowing release or increased release of fluid through the discharge chamber 58 of the pilot valve. Conversely, an increase in pressure on the use side of the reducing valve effects movement of the resistance plug 57 relatively toward its seat. This slight movement of the pilot valve resistance plug 57 in response to pressure fluctuation on the use side of the main control or pressure reducing valve proportions the fluid pressure supplied to the diaphragm chamber 33 of the main valve to maintain the main valve disc 22 in that position which passes fluid at the correct rate to hold the desired pressure on the use side of the system.

In the system of the present invention the fluid flow is restricted to one of the separate or parallel paths at any condition of operation as determined by the particular requirements of fluid pressure and flow rate on the use side. The main pressure reducing control valves in the other or parallel pipe lines are maintained closed until the demand situation changes so as to require fluid or steam at a different pressure or at a different rate, or at both a different pressure and a different rate, whereupon the system automatically shifts the flow to that one of the parallel pipe lines which is governed by the reducing valve operating in the desired pressure and rate range.

In the system described above, wherein the parallel steam pipes 3 and 4 are of different sizes and the totalizing meters M-3 and M-4 are rated at different capacities, the main pressure reducing valve C-3 governing the steam or fluid supply through the larger pipe line is set to maintain a relatively low back pressure, say about 50 pounds per square inch gauge, on the use side of the system. This pressure may be conveniently indicated on a gauge 68 connected by conduit tube 69 to conduit 67 let into and welded to the pipe line 3 and which also supplies the diaphragm chamber of the pilot valve P-3 through T's 72, a branch tube conductor 73, and the appropriate tube 50 leading into the cap of the pilot valve. The pressure reducing valve C-4 in the other or smaller pipe line is set to maintain a higher pressure, say about 55 pounds per square inch. This pressure may be conveniently indicated as by a gauge 77 connected by tube 78 to a tube 80 let into and welded to the pipe line 4 on the use side of the main control valve. The tube 80 also supplies the diaphragm chamber of the pilot valve P-4 through T's 79, a branch tube conductor 81, and the appropriate tube 50 leading into the pilot valve. Thus so long as the heating system or other using intsrumentality withdraws steam through the carry off or distribution pipe 2 at a rate which can be supplied through the regulating valve C-4 and the pipe line 4 the action of the reducing valve C-4 is to maintain the back pressure on the use side of the system to the right of the main pressure reducing control valve as viewed in Fig. 1 at some pressure above the predetermined minimum 50 pounds per square inch gauge and below the maximum of about 55 pounds per square inch gauge. As long as a back pressure of such amount is maintained on the use side of the system the reducing valve C-3 in the larger of the parallel pipe lines is maintained closed and the totalizing flow meter M-4 in the smaller of the pipe lines accurately measures the supply of steam to the heating system. Upon the occurrence of an increased demand in the heating system or other using instrumentality such that the pressure on the use side of the pressure reducing valves drops below that for which the reducing valve C-3 in the larger pipe line 3 is set the latter opens automatically by reason of the pilot valve operation described. The tubes 50 supplying fluid pressure to the diaphragm chambers of the two pilot valves from the use side of the system are desirably connected as by an equalizing tube 82 which extends between one of the T's 72 and one of the T's 79.

This arrangement insures the equalization of fluid pressure in the diaphragm chambers 54 of the two pilot valves P-3 and P-4. Thus when the system is operating in the pressure range of from 50 to 55 pounds gauge in the installation described so that the flow is through the upper or relatively high pressure pipe line 4, the pressure prevailing in the latter to the right of the reducing or control valve C-4 is imposed simultaenously and uniformly on the pilot valves of both parallel pipe lines. It is to be understood, of course, that the system will function without the equalization tube or pipe 82, since the pressure in the pipe line 4 to the right of the control valve C-4 and the pressure in the pipe line 3 to the right of the control valve C-3 equalize at the joining or common point through the T 7. In many installations, however, the equalizing T 7 or equivalent common point may be remote from the control valves C-3 and C-4, or one of them. It is apparent that in such a situation the equalizing tube 82 is desirable and is effective to insure adequate pressure in the diaphragm chamber of the pilot valve P-3 to keep the control valve C-3 fully closed.

When the tubes or conduits 50 through which fluid under pressure is supplied to the diaphragm chambers of the pilot valves are connected together as by the equalizing tube 82 it is desirable that means such as check valve 83 be interposed between the pilot valve P-4 and the pipe line 3 to prevent by-passing the high pressure meter M-4 at low flow rates, this being one of the features and objects of the invention. The check valve 83 is inserted, say, in the tube 73 which extends between the pipe T's 72. The check valve is so oriented that the flapper or valve body closes to prevent the flow of fluid into the pipe line 3 and opens for the flow of fluid therethrough when the pressure within the pipe line 3 exceeds that in the tubes 50 leading to the diaphragm chambers of the pilot valves P-3 and P-4. In the absence of the check valve 83 or equivalent the relatively high pressure prevailing in the pipe line 4 when the control valve C-4 is open and the control valve C-3 is closed will result in the flow of fluid from the pipe line 4 through the conduits 80 and 81, through the equalizing tube 82 and the tubes 73 and 67 to the pipe line 3. Fluid thus reaching the pipe line 3 would flow through the large capacity flow meter M-3 without registering thereon and would thus constitute an error in the measuring system.

In addition to the pressure gauge 68 which serves as a visual indicator by means of which the operator can check to see that control valve C-3 operates in the range below a desired predetermined maximum pressure, such as 50 pounds per square inch in the installation described, and the gauge 77 which similarly serves the operator to verify that the control valve C-4 functions over a given predetermined range, such as 50-55 pounds (or above a desired predetermined minimum pressure, such as 50 pounds per square inch) in the arrangement described, there may be provided a gauge 74 inserted in the tube 45 as by a pipe T 75 to serve as a visual indicator of the fluid pressure in the supply main. In the installation described the supply main 1 is at an elevated pressure such as about 125 pounds per square inch gauge.

As a refinement of the piping and control arrangement of each steam line the tube or conduit 48 which connects the outlet chamber 49 of the pilot valve to the head 31 of the main control valve is provided with a manually operable release or relief valve 97 (Fig. 2) inserted in the tube as by means of a pipe T 98. Regardless of the condition of the pilot valve P-3 (or P-4) or the metering valve 46, the main control or reducing valve C-3 (or C-4) can be opened by venting the fluid pressure from the diaphragm chamber 33 through the valve 97. This valve is not shown in the schematic figures, since it does not function in the automatic control system and is in the nature of an emergency or safety device.

When the requirements of the heating system demand steam at a rate that can be supplied satisfactorily through the larger pipe line 3 but not through the smaller pipe line 4 it is desired that the latter be closed and that the total supply at the higher rate be effected through the larger line 3. In the present system this desirable objective is obtained by means of an interconnection between the main flow control or pressure reducing valves of the parallel pipe lines. This interconnection or interlock effects an automatic closing of the reducing valve operating at the higher pressure (here the valve C-4) when the valve operating at the lower pressure (here the valve C-3) is opened by the lowering of the pressure on the use side of the system. The switchover operation to be described is improved by the use in the outlet of the high pressure control valve C-4 of a standard metering orifice (not shown).

Associated with the reducing valve C-3 which governs the fluid flow at relatively low pressures (under 50 pounds in the assumed situation) is a normally open electric switch 85 one terminal of which is connected to one lead of the solenoid 71 by a conductor 86 and the other terminal of which is connected to one of the conductors indicated at 87 of a standard two wire 110 volt alternating current electrical power supply system. The other conductor 88 of the power supply system is connected directly to the remaining lead of the solenoid 71. Energization of the solenoid obtained by closing the switch 85 shifts the solenoid armature (not shown) and through a suitable connection between the solenoid and the valve 70 closes the latter to prevent the escape of fluid from the discharge conduit 66 of the pilot valve P-4. Since the closing of the discharge or release conduit 66 prevents the bleeding of the steam or other fluid from the pilot valve P-4, the high pressure fluid entering the pilot valve from the high pressure side of the supply through the metering valve 46 acts on the diaphragm 29 of the pressure reducing control valve C-4 to shut the latter. In this fashion the energization of the solenoid 71 in response to the closing of the switch 85 results in an overriding of the pilot valve P-3 by the solenoid actuated valve 70 with positive and immediate closing of the reducing control valve C-4 so that fluid flow through the system is restricted to the larger conduit 3 under the control of the reducing valve C-3.

The switch 85 is conveniently carried by the valve C-3 as by being on a flat metal plate 90 (Fig. 3) bolted at 91 to spaced portions of the valve yoke 24. A projecting pivot pin 92 fast in and normal to the plate 90 carries a multiplying lever 93 to the free end of which is disposed under actuating pin 94 of the switch 85. The switch pin 94 projects through a boss in the bottom of the casing of the switch and is spring biased to the open position of the switch. Pressing the switch pin 94 into the casing as by upward movement of the lever 93 to the broken line position shown in Fig. 3 acts to close the switch and produce the energization of the solenoid 71. This switch actuating movement of the multiplying lever 93 is effected by an adjustable height stud 95 carried by a block 96 fast on the projecting upper end of the indicator pin 40. As previously mentioned, the pin 40 as well as its companion pin 41 on the opposite side of the spring housing of the pressure reducing control valve moves with the main diaphragm plug 28 in the opening and closing of such valve. The head of the bolt 95 contacts the knife edge fulcrum of a boss 98 formed on the lower side of the multiplying lever 93. Adjustment of the bolt 95 varies the position of the main valve closure disc 22 at which the solenoid circuit is energized to effect closing of the other or interconnected reducing valve C-4 and thereby restrict the fluid flow to the reducing valve C-3 and the conduit line 3. In the example installation described above the adjustment of the stud 95 is set to close the switch 75 when the passage controlled by the main valve disc 22 is about 20 percent open. The particular point at which the energization of the solenoid actuating circuit occurs is not critical and a range of from about 15 percent to about 25 percent is satisfactory and other percentage openings can be used if desired.

With less than about 15 percent opening in the reducing control valve C-3 when the valve C-4 is positively closed by the overriding action of the solenoid valve 70 the flow meter M-3 functions to the exclusion of the other flow meter M–4 in a range of flow rates where its accuracy is relatively less than that of such other flow meter. With over about 25 percent opening in the valve C–3 when valve C–4 is closed, the flow meter M–4 (selected to function over a relatively low range of flow rates) may be compelled to operate at rates above its rating.

In Fig. 4 is illustrated a modification of the invention wherein an interconnection between the control valves in the two pipe lines is maintained by a fluid medium in lieu of the electrical means described in connection with the preceding figures. Since most of the parts and components employed in the fluid interconnected or closed fluid system of Fig. 4 are the same as those described in connection with the preceding figures, they have been indicated by primed letters and numerals of reference which are otherwise the same as those used in identifying the corresponding parts of the preceding figures.

To effect the interconnection between the main control or reducing valves C–3' and C–4' and thereby obtain the desired positive closing of the one, or high pressure valve C–4', when the other, or low pressure control valve C–3' is open, an overriding or reverse pilot RP is connected to the discharge tube 66' of the pilot P–4'. This reverse pilot is constructed of parts many of which are similar to and, in fact, may be identical with corresponding parts used in the pilot valves P–3' and P–4'. Such corresponding parts have been indicated by the same reference numerals.

With respect to the opening and closing of the valve there is, however, a difference, in that a reverse operation is obtained. On the lower end of the stem 56' is a closure element 100 which is movable upwardly into sealing relation against an annular valve seat member 101 secured in an aperture of the dividing partition which separates the hollow interior of body 102 of the reverse pilot valve into receiving and discharge chambers 103 and 104, respectively. Thus in the reverse pilot valve the spring 62' acts normally to lift the rod 56' and hold the sealing element 100 against the valve seat 101 and thereby prevent the flow of fluid between the inlet chamber 103 and the discharge chamber 104. Upon an increase in the fluid pressure within the diaphragm chamber 54' the force in the spring 62' is overcome, the valve rod 56' is forced downwardly and the sealing element 100 is displaced from the seat 101 to permit the flow of fluid through the valve. Fluid under pressure to govern opening and closing of the reverse pilot valve RP is supplied to the diaphragm chamber 54' through a tube or conduit 105 which is screwed into the top opening of the cap 52'. The tube 105 is connected to the tube 48' which extends between the outlet chamber of the pilot valve P–3' and the diaphragm chamber of the main control or reducing valve C–3'. In the schematic figure or diagram the tube 105 is shown connected directly to the tube 48, it being understood that a convenient arrangement is to attach the tube 105 to the tube 48 through a pipe T and a manual release valve such as the T–98 and the release valve 97 previously described.

In the system of Fig. 4 the interconnecting tube 105 imposes the same pressure on the diaphragm of the reverse pilot valve RP as prevails in the diaphragm chamber (corresponding to the diaphragm chamber 33 previously described) of the main control valve C—3'. Such pressure is determined by the pilot valve P–3'. It is thus apparent that when the interconnecting tube 105 is joined to the tube 48 as through a valve and T (like the valve 97 and the T–98, Fig. 2) such valve must be open for and during normal operation of the system.

During operation of the system of Fig. 4, which eliminates the electrical interconnecting or interlocking elements comprising the electric solenoid valve 70, the electric switch 85 and the conductors 86—88 that characterize the system of Fig. 1, the reverse pilot valve RP performs the overriding function to monitor the servient or higher pressure pipe line as previously described in connection with the solenoid operated valve 70. Assuming the conditions previously mentioned, wherein fluid or steam pressure in the supply main 1 is of the order of about 125 pounds per square inch gauge, the control or reducing valve C–3' in the larger pipe line 3' is set to open at some preselected pressure, say at pressures below about 50 pounds gauge as indicated on the gauge 68'. The control or reducing valve C–4' is set to open at some other and higher preselected pressure, say at pressures below 55 pounds gauge as indicated on the gauge 77'.

When the pressure in the using system or instrumentality supplied by the pipe 2' is such (as by reason of heavy demand) that the pressure in the pipes 3' and 4' to the right of the valves C–3' and C–4' is below 50 pounds gauge the pilot valve P–3' is open, venting the diaphragm chamber (corresponding to the chamber 33 shown in Fig. 2) of the main control valve C–3' so that the latter is open and fluid flows from the supply to the use through the pipe line 3'. This flow is at a relatively high rate and is measured by the high rate totalizing flow meter M–3'.

In such a situation with the pilot valve P–3' open the diaphragm chamber 54' of the reverse pilot RP is vented through the interconnecting tube 105 and the tube 48', the latter being open to atmosphere through the pilot valve P–3'. The venting of the reverse pilot diaphragm chamber in this manner allows the spring 62' of the reverse pilot to hold or, if such valve is open, to shift upwardly the valve rod 56' to retain the sealing element 100 against the valve seat 101. Thus when the pilot valve P–3' is open the reverse pilot valve RP is closed. The closed reverse pilot traps fluid within the pilot valve system of the main control or reducing valve C–4' so that fluid under pressure entering such pilot valve system through the metering valve 46' associated therewith acts on the main diaphragm of the control valve C–4' to close the latter and to keep it closed. Hence when the system of the present invention is passing fluid from supply to use through the dominant control valve C–3' the servient valve C–4' is positively closed.

Upon an increase in fluid pressure within the heating system or other using instrumentality as by decreased demand such that the pressure registered by the gauge 68' increases to above 50 pounds gauge the corresponding increase in the fluid pressure acting on the diaphragm (like the diaphragm 55 of the Fig. 2 pilot valve) of the pilot valve P–3' closes the latter and prevents the discharge to atmosphere of high pressure fluid introduced into the pilot valve system of the valve C–3' through the associated metering valve 46'. The increase in pressure on the main diaphragm of the control valve C–3' which results from the closing of the pilot valve P–3' is transferred through the interconnecting tube 105 to the diaphragm chamber of the reverse pilot valve RP. This concurrent increase in pressure on the diaphragm of the reverse pilot valve opens the latter and allows the venting of high pressure fluid from the main diaphragm chamber of the control valve C–4' through the open pilot valve P–4' and the release conduit 66' of the latter.

By adjustment of the meter valves 46' supplying high pressure fluid to the pilot valves the time cycle relation, which may be either lead or lag, between closing of the dominant control valve C–4' and the opening of the servient control or reducing valve C–3' can be regulated as desired. So long as the control valve C–4' passes fluid into the using system at a rate sufficient to maintain the pressure to the right of the reducing valves above the predetermined minimum, in the example assumed above 50 pounds gauge and in the range between 50 and 55 pounds, or thereabouts as the system may be adjusted, the system is in balance. Slight variations in the rate of use produce variations in back pressure on the system and are accommodated by automatic opening or closing movement of the control valve C–4' as governed by the pilot valve P–4'.

In the event the back pressure in the carry-off main 2' and the pipe line 4' increases to 55 pounds gauge or above, such pressure, transmitted to the diaphragm of the pilot valve P–4' through the conduits 80', 81' and 50' closes such pilot valve and effects closing of the main reducing or control valve C–4' with resultant complete cessation of fluid flow through the system. On the other hand, an increased demand for steam by the heating system or other using instrumentality manifested in a reduction in the back pressure prevailing in the pipe lines 3' and 4' effects an opening of the pilot valve P–3' so that the main control or reducing valve C–3' governed thereby is opened and the supply of steam to the using instrumentality is shifted back to the pipe line 3, the valve C–4' closing as described.

The present invention thus provides a system for controlling flow of fluid under pressure from a supply to a use wherein the fluid is conducted wholly over one path, here the pipe line 4, or 4', at use pressures above a predetermined minimum, and is conducted wholly over another path, here the pipe line 3, or 3', at use pressures below a predetermined maximum. This operation is effected by separate flow control valves in each of a plurality of pipe lines and means automatically effecting closing of one of the valves upon opening of another.

In the two-conductor steam system exemplifying the invention a first or dominant reducing valve is located in one of the conductors to cover the flow of fluid therethrough and a second or servient reducing valve is located in the other of the conductors to govern the flow of fluid therethrough. Each of the control valves includes a fluid actuated operating mechanism and each such valve has associated therewith a pilot valve for supplying fluid to such operating mechanism. This fluid is obtained from the control system and the supply of fluid to the control valve operating mechanism is made by the pilot valve in response to the fluid pressure on the discharge side of the corresponding reducing valve. The first reducing valve is set to maintain in the one conductor a lower pressure than the second reducing valve is set to maintain in the other of the conductors. By means such as the solenoid actuated valve described in connection with Fig. 1 or the reverse pilot described in connection with Fig. 4 the pilot valve of the second or servient reducing valve is overridden automatically upon opening of the first reducing valve and the positive closing of the second reducing valve is thus automatically effected.

Although the invention has been described in connection with a system for measuring the supply of steam to a heating plant or other using instrumentality, it is apparent that the totalizing meters M–3 and M–4 can be eliminated or replaced by other devices and the system can be used in other arrangements and for other purposes as for the control of the supply of fluid under pressure to a number of separate uses from a common source.

In accordance with the patent statutes the principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What I claim and desire to secure by Letters Patent of the United States is:

1. In a fluid system of multiple lines of pipe through each of which fluid under pressure is to flow, a pressure reducing valve in one of the pipe lines providing high and low pressure sections in such one line and operating automatically to maintain a predetermined pressure in the low pressure section of said one line, another pressure reducing valve in another of the pipe lines providing high and low pressure sections in such other line and operating automatically to maintain a predetermined pressure less than said previously mentioned predetermined pressure in the low pressure section of said other of the pipe lines, and means responsive to pressure in one of the low pressure sections and energized by fluid under pressure from one of the high pressure sections automatically effecting closing of the first mentioned reducing valve when the said other reducing valve is open.

2. In a fluid system comprising a plurality of pipe lines, a flow control valve in each pipe line providing high and low pressure sections in each of said lines, and means responsive to pressure in one of the low pressure sections and energized by fluid under pressure from one of the high pressure sections automatically effecting closing of one of the valves upon opening of another.

3. In a fluid system comprising a plurality of pipe lines, a pressure reducing valve in one of the pipe lines and operating automatically to maintain a predetermined pressure in said one line, the reducing valve including an element which moves in one direction during opening and in another direction during closing of the valve, a flow control valve in and dividing another of the pipe lines into upstream and downstream portions, and means independent of the condition of the fluid in the downstream portion of said other line governing the opening and closing of the flow control valve in response to the movement of said element automatically to effect closing of the flow control valve when the reducing valve is opened.

4. In a fluid system comprising a plurality of pipe lines, a pressure reducing valve in one of the pipe lines and operating automatically to maintain a predetermined pressure in said one line, the reducing valve including an element which moves in one direction during opening and in another direction during closing of the valve, a flow control valve in another of the pipe lines, electrical means governing the opening and closing of the flow control valve, and an electrical circuit associated with said electrical means and so constructed and arranged as to be energized in response to the movement of said element automatically to effect closing of the flow control valve when the reducing valve is opened.

5. In a fluid system comprising a plurality of pipe lines, a pressure reducing valve in one of the pipe lines and operating automatically to maintain a predetermined pressure in said one line, the reducing valve including an element which moves in one direction during opening and in another direction during closing of the valve, a flow control valve in another of the pipe lines, an electrical solenoid governing the opening and closing of the flow control valve, and an electrical circuit including a switch for energizing the solenoid, the switch being responsive to the movement of said element automatically to effect closing of the flow control valve when the reducing valve is opened.

6. In a fluid system comprising a plurality of pipe lines, a pressure reducing valve in one of the pipe lines and operating automatically to maintain a predetermined pressure in said one line, said valve comprising a fluid pressure actuated closure member and a pilot valve for supplying fluid under pressure to the closure member in inverse response to the fluid pressure in said one line, a flow control valve in another of the pipe lines, and means operating automatically upon opening of the flow control valve to override the pilot valve and effect closing of the reducing valve.

7. In a fluid system comprising a plurality of pipe lines, a pressure reducing valve in one of the pipe lines and operating automatically to maintain a predetermined pressure in said one line, said valve comprising a fluid pressure actuated closure member and a pilot valve for supplying fluid under pressure to the closure member in inverse response to the fluid pressure in said one line, a flow control valve in another of the pipe lines, an overriding valve associated with the pilot valve, and means arranged to actuate the overriding valve upon opening of the flow control valve to override the pilot valve and effect closing of the reducing valve.

8. In a fluid system comprising a plurality of pipe lines, a pressure reducing valve in one of the pipe lines and operating automatically to maintain a predetermined pressure in said one line, said valve comprising a fluid pressure actuated closure member and a pilot valve for supplying fluid under pressure to the closure member in inverse response to the fluid pressure in said one line, a flow control valve in another of the pipe lines, a fluid pressure operated overriding valve associated with the pilot valve, and means associated with the flow control valve and synchronized with the opening of the latter to alter the fluid pressure supply to the overriding valve and thereby effect activation of the latter to override the pilot valve and effect closing of the reducing valve.

9. In a two conductor fluid system, a first reducing valve in one of the conductors governing fluid flow therethrough, a second reducing valve in the other of the conductors governing fluid flow therethrough, each valve including a fluid actuated operating mechanism, a pilot valve and conduit means associated with each reducing valve for supplying fluid to the operating mechanism thereof from the system in response to the fluid pressure on the discharge side of the corresponding reducing valve, and means associated with one of the pilot valves automatically effecting closing of the reducing valve supplied by said one pilot valve upon opening of the other of the reducing valves.

10. In a two conductor fluid system, a first reducing valve in one of the conductors governing fluid flow therethrough, a second reducing valve in the other of the conductors governing fluid flow therethrough, each valve including a fluid actuated operating mechanism, a pilot valve and conduit means associated with each reducing valve for supplying fluid to the operating mechanism thereof from the system in response to the fluid pressure on the discharge side of the corresponding reducing valve, and an overriding valve associated with one of the pilot valves to effect a supply of fluid under pressure to the operating mechanism of the one reducing valve normally supplied by said one pilot valve, in response to the pressure of the fluid supplied to the operating mechanism of the other of the reducing valves by the other of the pilot valves.

11. A system for controlling the flow of fluid under pressure from a supply to a use comprising conductor means providing parallel paths for the fluid, a fluid actuated pressure reducing valve in each path operating automatically to vary the flow rate therein inversely to the use pressure, and means interconnecting the reducing valve in one path with that in another and making the latter dominant and the former servient, said interconnecting means being adapted automatically to effect closing of the valve in one path subsequent to opening of the valve in the other path and in response to the condition of the latter.

12. A system for controlling the flow of fluid under pressure from a supply to a use comprising conductor means providing parallel paths for the fluid, a pressure reducing valve in one of the paths for varying the flow rate therein inversely to the use pressure, a valve in another of the paths, and means interconnecting the valves and making one servient to the other, said interconnecting means being adapted to effect closing of the reducing valve automatically after opening of the valve in said other path and in response to the condition of the latter.

13. A system for controlling the flow of fluid in pipe lines comprising in combination one line having a pressure reducing valve constituting a divider separating such one line into high pressure supply and low pressure distribution sides, said valve including means governing its opening and closing in response to the pressure prevailing in the low side of such line, another line having a valve constituting a divider separating such other line into supply and distribution sides, said valve in the other line being responsive to a condition of the fluid in such other line, and fluid actuated means independent of the pressure in the low pressure distribution side of the one line and responsive to the condition of the last mentioned valve effecting positive closing of the reducing valve automatically upon predetermined opening of such last mentioned valve.

14. In combination in a fluid flow control system, a plurality of pipe lines, a pressure reducing valve in one of the pipe lines and dividing such one line into high pressure and low pressure sections, said reducing valve operating automatically to maintain a predetermined pressure in the low pressure section of such one line, a flow control valve in another of the pipe lines, and means responsive to a condition of the flow control valve automatically to effect positive closing of the reducing valve, said valve closing means being independent of the fluid pressure in the low pressure section of the one line to override the automatic operation of the reducing valve.

15. In combination in a fluid flow control system, a plurality of pipe lines, a pressure reducing valve in one of the pipe lines and dividing such one line into high pressure and low pressure sections, said reducing valve operating automatically to maintain a predetermined pressure in the low pressure section of such one line, a flow control valve in another of the pipe lines and dividing the latter into supply and use sections, and means responsive to a condition of the reducing valve automatically to effect positive closing of the flow control valve, said valve closing means being independent of the condition of the fluid in the use section of such other line positively to close the flow control valve upon occurrence of said reducing valve condition.

16. In combination in a fluid flow control system, pipe lines connected in parallel between supply and distribution points, a first pressure reducing valve in one of the parallel lines, a second pressure reducing valve in another of the parallel lines, means actuating the first valve automatically in response to the fluid pressure prevailing in the one line on the low side of such first valve to pass fluid through the one line from the supply point to the distribution point to maintain one predetermined pressure in the one line on the low side of said first valve and at the distribution point, means actuating the second valve automatically in response to the fluid pressure prevailing in the other line of the low side of such second valve to pass fluid through the other line from the supply point to the distribution point to maintain in such other line on the low side of said second valve and at the distribution point a predetermined pressure higher than said one predetermined pressure, and means coupling the second valve to the first valve automatically effecting closing of the second valve upon opening of the first valve to a predetermined percentage of its capacity, whereby all demands at the distribution point at pressures between said one predetermined pressure and said higher predetermined pressure are supplied solely through the second valve and all demands at the distribution point in excess of said predetermined capacity percentage of the first valve at pressures below said one predetermined pressure are supplied solely through the first valve.

17. In combination in a fluid flow control system, a plurality of pipe lines, a reducing valve in each line dividing it into high and low pressure sections, and fluid actuated means automatically closing the valve in one of the lines concurrently with the opening of the valve in another of the lines, said automatic means being independent of the condition of the fluid in the low pressure section of said one line.

18. In combination in a fluid flow control system, a pressure reducing valve having a fluid actuated operating mechanism, a pilot valve connected to receive fluid from the high pressure side of the reducing valve and deliver such received fluid to the operating mechanism of the reducing valve, the pilot valve being responsive to the pressure on the low side of the reducing valve automatically to regulate the said delivery of fluid to the reducing valve operating mechanism to actuate the reducing valve to maintain a predetermined pressure on said low side, a valve connected to override said response of the pilot valve and effect positive delivery of fluid to the operating mechanism of the reducing valve to close the latter, a flow control valve, and means governing the overriding valve in response to a condition of the flow control valve.

19. In combination in a fluid flow control system, a pressure reducing valve connected between a relatively high pressure fluid supply and a relatively low pressure fluid use, said reducing valve being yieldingly biased to open position and having fluid actuated operating means to effect valve closure, a pilot valve connected to receive high pressure fluid and variably either release such received fluid or deliver it to the operating means of the reducing valve, the pilot valve being responsive to the fluid pressure on the low side of the reducing valve automatically to regulate the said delivery of fluid to the reducing valve operating means to actuate the reducing valve to maintain a predetermined pressure on said low side, a valve in the high pressure fluid connection of the pilot valve to control the rate high pressure fluid is received by the pilot valve, and a valve connected to override the response of the pilot valve and prevent release of high pressure fluid received by the pilot valve to thereby effect positive delivery of such received fluid to the operating means of the reducing valve to close the latter.

20. In combination in a fluid flow control system, a pressure reducing valve connected between a relatively high pressure fluid supply and a relatively low pressure fluid use, said reducing valve being yieldingly biased to open position and having fluid actuated operating means to effect valve closure, a pilot valve connected to receive high pressure fluid and variably either release such received fluid or deliver it to the operating means of the reducing valve, the pilot valve being responsive to the fluid pressure on the low side of the reducing valve automatically to regulate the said delivery of fluid to the reducing valve operating means to actuate the reducing valve to maintain a predetermined pressure on said low side, a valve in the high pressure fluid connection of the pilot valve to control the rate high pressure fluid is received by the pilot valve, and an electromagnetic valve connected to the fluid release of the pilot valve to prevent release of high pressure fluid received by the pilot valve and thereby override the pilot valve and effect positive delivery of such received fluid to the operating means of the reducing valve to close the latter.

21. In combination in a fluid flow control system, a pressure reducing valve connected between a relatively high pressure fluid supply and a relatively low pressure fluid use, said reducing valve being yieldingly biased to open position and having fluid actuated operating means to effect valve closure, a pilot valve connected to receive high pressure fluid and variably either release such received fluid or deliver it to the operating means of the reducing valve, the pilot valve being responsive to the fluid pressure on the low side of the reducing valve automatically to regulate the said delivery of fluid to the reducing valve operating means to actuate the reducing valve to maintain a predetermined pressure on said low side, a valve in the high pressure fluid connection of the pilot valve to control the rate high pressure fluid is received by the pilot valve, a second reducing valve, a second pilot valve, a second control valve, said second reducing pilot and control valves being similar to the first mentioned corresponding valves and similarly connected together, a valve connected to override the response of the first mentioned pilot valve and prevent release of high pressure fluid received by the latter to thereby effect positive delivery of such received fluid to the operating means of the first mentioned reducing valve to close the latter, and means governing the overriding valve in response to a condition of the second reducing valve.

References Cited in the file of this patent

UNITED STATES PATENTS

| | | |
|---|---|---|
| 1,078,257 | Chrisman | Nov. 11, 1913 |
| 1,108,721 | Dodge | Aug. 25, 1914 |
| 1,803,437 | Riney et al. | May 5, 1931 |
| 2,294,753 | Hedman | Sept. 1, 1943 |
| 2,410,876 | Griswald | Nov. 12, 1946 |
| 2,547,823 | Josephian | Apr. 3, 1951 |

UNITED STATES PATENT OFFICE
CERTIFICATE OF CORRECTION

Patent No. 2,832,367 April 29, 1958

Jay P. Au Werter

It is hereby certified that error appears in the above numbered patent requiring correction and that the said Letters Patent should read as corrected below.

In the grant, lines 1 to 3, for "Jay P. Au Werter, of Cleveland, Ohio," read -- Jay P. Au Werter, of Cleveland, Ohio, assignor to The C. E. Squires Company, of Cleveland, Ohio, a corporation of Ohio, --; line 12, for "Jay P. Au Werter, his heirs" read -- The C. E. Squires Company, its successors --; in the heading to the printed specification, line 4, for "Jay P. Au Werter, Cleveland, Ohio" read -- Jay P. Au Werter, Cleveland, Ohio, assignor to The C. E. Squires Company, Cleveland, Ohio, a corporation of Ohio --.

Signed and sealed this 5th day of August 1958.

(SEAL)
Attest:

KARL H. AXLINE
Attesting Officer

ROBERT C. WATSON
Commissioner of Patents